US 8,799,281 B2

(12) United States Patent
Chun et al.

(10) Patent No.: US 8,799,281 B2
(45) Date of Patent: Aug. 5, 2014

(54) INFORMATION STORAGE MEDIUM HAVING RECORDED THEREON AV DATA INCLUDING META DATA WITH REPRESENTATIVE TITLE INFORMATION, APPARATUS FOR REPRODUCING AV DATA FROM THE INFORMATION STORAGE MEDIUM, AND METHOD OF SEARCHING FOR THE META DATA

(75) Inventors: Hye-jeong Chun, Yongin-si (KR);
Sung-wook Park, Seoul (KR);
Jung-wan Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1243 days.

(21) Appl. No.: 11/139,591

(22) Filed: May 31, 2005

(65) Prior Publication Data
US 2006/0059177 A1 Mar. 16, 2006

(30) Foreign Application Priority Data
Sep. 13, 2004 (KR) ........................ 10-2004-0073134

(51) Int. Cl.
*G06F 17/30* (2006.01)
*G06F 3/12* (2006.01)

(52) U.S. Cl.
CPC ................................ *G06F 17/30058* (2013.01)
USPC ........................................ 707/736; 358/1.11

(58) Field of Classification Search
USPC ............... 707/104.1, 1, 3, 4, 5, 6, 9; 709/225, 709/231; 718/1; 715/500
See application file for complete search history.

(56) References Cited

U.S. PATENT DOCUMENTS

| | | | |
|---|---|---|---|
| 6,295,559 B1 * | 9/2001 | Emens et al. ................. 709/225 |
| 6,429,364 B1 * | 8/2002 | Muraki et al. .................. 84/600 |
| 6,678,203 B1 | 1/2004 | Yokota et al. | |
| 7,127,454 B2 * | 10/2006 | Deguchi ............................ 707/3 |
| 7,246,127 B2 * | 7/2007 | Murakami et al. ............ 707/100 |
| 7,493,341 B2 * | 2/2009 | Israel et al. ................ 707/104.1 |
| 2001/0047377 A1 * | 11/2001 | Sincaglia et al. ................ 709/1 |
| 2002/0019833 A1 * | 2/2002 | Hanamoto .................... 707/500 |
| 2002/0055970 A1 * | 5/2002 | Noro ............................ 709/203 |
| 2002/0147728 A1 * | 10/2002 | Goodman et al. .......... 707/104.1 |

(Continued)

FOREIGN PATENT DOCUMENTS

| | | |
|---|---|---|
| EP | 1 102 271 | 5/2001 |
| EP | 1 102 276 | 5/2001 |

(Continued)

OTHER PUBLICATIONS

Search Report issued in International Patent Application No. PCT/KR2005/002939 on Oct. 28, 2005.

(Continued)

*Primary Examiner* — Tarek Chbouki
(74) *Attorney, Agent, or Firm* — NSIP Law

(57) ABSTRACT

An information storage medium having recorded thereon audio/video (AV) data including meta data with representative title information, and a method and apparatus for reproducing the AV data from the information storage medium, wherein the information storage medium having recorded thereon AV data including meta data includes storage medium information about the AV data recorded on the information storage medium and title information about at least one title constituting the AV data. The title information includes representative title information that designates at least one of the titles as a representative title.

6 Claims, 8 Drawing Sheets

(56) References Cited

U.S. PATENT DOCUMENTS

| | | | |
|---|---|---|---|
| 2002/0178276 A1* | 11/2002 | McCartney et al. | 709/231 |
| 2002/0198864 A1 | 12/2002 | Ostermann et al. | |
| 2003/0081249 A1* | 5/2003 | Ahmad et al. | 358/1.15 |
| 2003/0085913 A1* | 5/2003 | Ahmad et al. | 345/730 |
| 2003/0093260 A1* | 5/2003 | Dagtas et al. | 704/1 |
| 2003/0182297 A1* | 9/2003 | Murakami et al. | 707/100 |
| 2003/0185110 A1 | 10/2003 | Fujisawa | |
| 2004/0175159 A1* | 9/2004 | Oetzel et al. | 386/125 |
| 2004/0189646 A1* | 9/2004 | Hayashi et al. | 345/473 |
| 2004/0215643 A1* | 10/2004 | Brechner et al. | 707/100 |
| 2004/0230558 A1* | 11/2004 | Tokunaka | 707/1 |
| 2004/0255340 A1* | 12/2004 | Logan | 725/145 |
| 2004/0267388 A1* | 12/2004 | Perdon | 700/94 |
| 2005/0050047 A1* | 3/2005 | Laronne et al. | 707/9 |
| 2005/0055372 A1* | 3/2005 | Springer et al. | 707/104.1 |
| 2005/0060741 A1* | 3/2005 | Tsutsui et al. | 725/32 |
| 2005/0149557 A1* | 7/2005 | Moriya et al. | 707/104.1 |
| 2005/0182792 A1* | 8/2005 | Israel et al. | 707/104.1 |
| 2005/0226603 A1* | 10/2005 | Hirabayashi et al. | 386/95 |
| 2005/0235338 A1* | 10/2005 | AbiEzzi et al. | 725/142 |
| 2006/0126451 A1* | 6/2006 | Shinkai et al. | 369/30.3 |
| 2008/0021910 A1* | 1/2008 | Murakami et al. | 707/100 |
| 2008/0075431 A1* | 3/2008 | Moriya et al. | 386/95 |

FOREIGN PATENT DOCUMENTS

| | | |
|---|---|---|
| EP | 1 244 023 A2 | 9/2002 |
| EP | 1 296 519 | 3/2003 |
| EP | 1 324 222 A2 | 7/2003 |
| EP | 1 355 241 A2 | 10/2003 |
| EP | 1 372 087 | 12/2003 |
| EP | 1 387 294 A1 | 2/2004 |
| EP | 1 411 520 | 4/2004 |
| EP | 1 653 466 | 5/2006 |
| JP | 05-233699 | 9/1993 |
| JP | 2000-156023 | 6/2000 |
| JP | 2001-142495 | 5/2001 |
| JP | 2001-184802 | 7/2001 |
| JP | 2001-216726 | 8/2001 |
| JP | 2002-074911 | 3/2002 |
| JP | 2002-108892 | 4/2002 |
| JP | 2003-122761 | 4/2003 |
| KR | 10-2006-0024241 | 3/2006 |
| KR | 10-0565080 B1 | 3/2006 |
| RU | 2 222 115 C2 | 10/2002 |
| WO | WO-99/49663 | 9/1999 |
| WO | WO 2006/011748 | 2/2006 |

OTHER PUBLICATIONS

Taylor, J. "DVD Demystified". Jan. 1, 2001. McGraw-Hill, New York. pp. 512-514.
Communication issued by the European Patent Office on Mar. 16, 2009.
European Search Report issued on Jan. 26, 2010, in corresponding European Application No. 09174251.0 (8 pages).
Malaysian Search Report issued on Feb. 22, 2010, in corresponding Malaysian Application No. PI 20052935 (3 pages).
Japanese Office Action issued on Sep. 28, 2010, in corresponding Japanese Application No. 2007-531071 (3 pages).
Malaysian Office Action issued on Feb. 12, 2010, in counterpart Malaysian Application No. PI 20052935 (3 pages, in English).
J. Taylor, *DVD Demystified*, Second Edition, pp. 512-514, Dec. 22, 2000, McGraw-Hill Professional, New York.
International Search Report and Written Opinion of the International Searching Authority issued on Oct. 28, 2005, in counterpart International Application No. PCT/KR2005/002939 (6 pages, in English).
Extended European Search Report issued on Mar. 16, 2009, in counterpart European Application No. 05808554.9 (7 pages, in English).
Extended European Search Report issued on Jan. 26, 2010, in counterpart European Application No. 09174251.0 (8 pages, in English).
Malaysian Office Action issued on Feb. 12, 2010, in counterpart Malaysian Application No PI 20052935 (3 pages, in English).
Japanese Office Action issued on Sep. 28, 2010, in counterpart Japanese Application No. 2007-531071 (6 pages, in Japanese, including complete English translation).
Russian Decision on Grant a Patent for Invention mailed Apr. 20, 2012, issued in counterpart Russian Patent Application No. 2008113773; 10 pages including English translation.

* cited by examiner

INFORMATION STORAGE MEDIUM HAVING RECORDED THEREON AV DATA INCLUDING META DATA WITH REPRESENTATIVE TITLE INFORMATION, APPARATUS FOR REPRODUCING AV DATA FROM THE INFORMATION STORAGE MEDIUM, AND METHOD OF SEARCHING FOR THE META DATA

CROSS-REFERENCE TO RELATED APPLICATION

This application claims the priority of Korean Patent Application No. 2004-73134, filed on Sep. 13, 2004 in the Korean Intellectual Property Office, the disclosure of which is incorporated herein by reference.

BACKGROUND OF THE INVENTION

1. Field of the Invention

The present invention relates to meta data, and more particularly, to an information storage medium having recorded thereon audio/video (AV) data including meta data with representative title information and a method and apparatus for reproducing the AV data from the information storage medium.

2. Description of the Related Art

When AV data is recorded on a medium such as a disc, information called meta data is also recorded, to describe the recorded contents. In other words, the disc includes information about the disc name, production date, the artist, and the director. Thus, a user can easily search through a collection by using the meta data.

Once a disc is loaded into a player, the meta data remains in the player. As more discs are loaded into the player, the amount of meta data remaining in the player increases. As a result, it takes much time for a user to find desired content by searching the meta data.

SUMMARY OF THE INVENTION

According to an aspect of the present invention, there is provided an information storage medium having recorded thereon AV data including meta data, in which representative title information of a disc is further included in the meta data without changing a conventional meta data structure, allowing a preferential search for meta data of a representative title of a disc to be done during a meta data search, thereby speeding the meta data search, and a method and apparatus of reproducing data from the information storage medium.

According to another aspect of the present invention, there is provided an information storage medium having recorded thereon AV data including meta data, which is designed to provide a user with abundant information by showing representative title information along with disc information to the user, and a method and apparatus for reproducing data from the information storage medium.

According to one aspect of the present invention, there is provided an information storage medium having recorded thereon audio/video (AV) data including meta data. The information storage medium includes storage medium information about AV data recorded on the information storage medium and title information about at least one title constituting the AV data. The title information includes representative title information that designates at least one of the titles as a representative title.

According to another aspect of the present invention, the information storage medium may be an optical disc and the storage medium information may be disc information about the AV data recorded on the optical disc.

According to another aspect of the present invention, a plurality of items of title information may be included in the optical disc, and at least one of the titles may be designated as a representative title.

According to another aspect of the present invention, the title information may include representative title information and general title information, and the representative title information may be structurally placed higher than the general title information and include the general title information connected using a sub link.

According to another aspect of the present invention, the title information may include representative title information and general title information, and the representative title information may be structurally placed at the same level as the general title information and the representative title may have an ID that is different from a general title.

According to another aspect of the present invention, there is provided an apparatus for reproducing audio/video (AV) data. The apparatus includes a meta data storing unit which stores meta data of an inserted information storage medium, and a search unit which receives a search condition and searches the meta data for a title designated as a representative title preferentially over the meta data of other titles.

According to another aspect of the present invention, the apparatus may further include a user interface unit which receives a user's search condition, and a display unit which outputs the result of the search by the search unit.

According to another aspect of the present invention, the meta data storing unit may further include storage medium information about AV data recorded on the information storage medium and title information about at least one title constituting the AV data. The title information may include representative title information that designates at least one of the titles as a representative title.

According to still another aspect of the present invention, there is provided a method of searching for meta data. The method includes once an information storage medium is inserted, storing meta data of the inserted information storage medium, and receiving a search condition and searching the meta data for a title designated as a representative title preferentially over meta data of other titles.

According to yet another aspect of the present invention, there is provided a method of reproducing audio/video (AV) data. The method includes once an information storage medium is inserted, storing meta data of the inserted information storage medium, receiving a search condition and searching the meta data for a title designated as a representative title preferentially over meta data of other titles, and outputting the result of the search.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
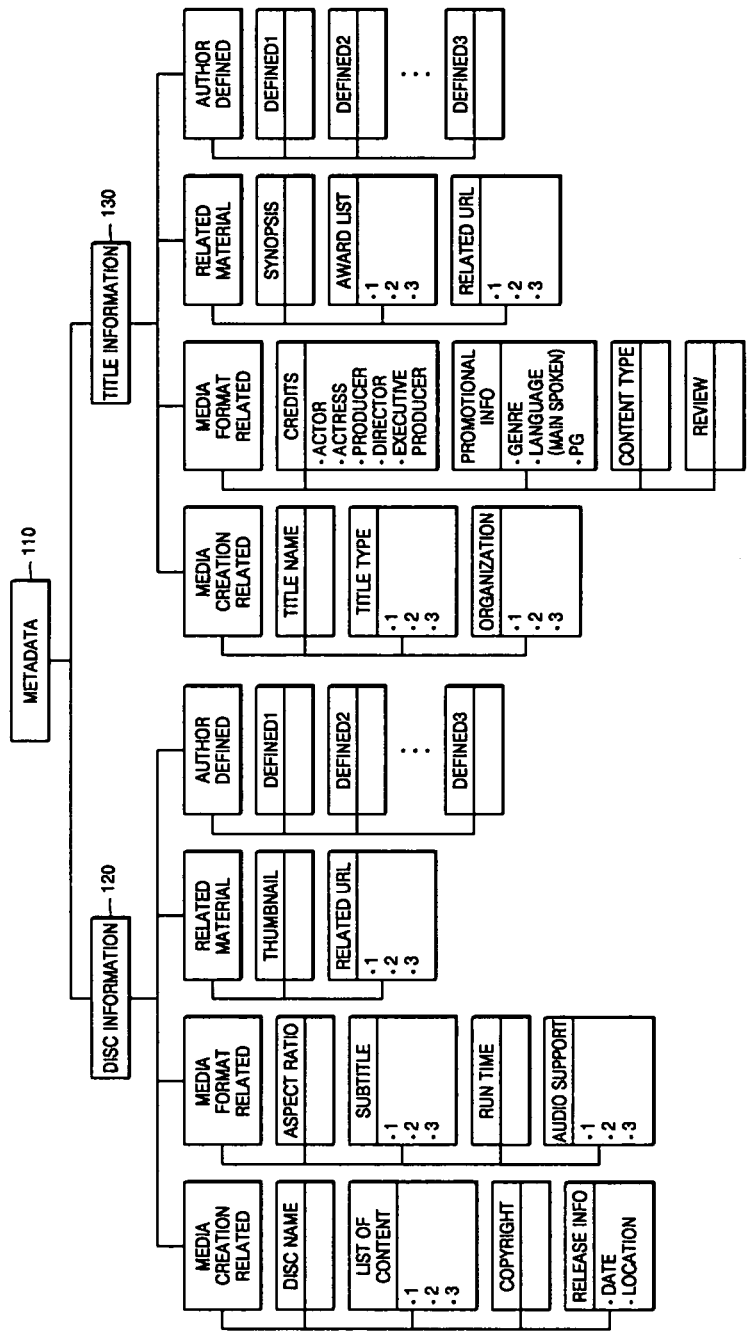
FIG. 1 illustrates the structure of meta data.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 illustrates the structure of meta data. Meta data 110 recorded on a disc includes disc information 120 that is directly related to the disc itself or commonly applied to all titles, and title information 130 that is related to titles recorded on the disc. It can be seen from FIG. 1 that the disc information 120 includes meta data related to disc creation, the disc format, materials related to the disc, and other information defined by the author of the disc. The meta data related to disc creation includes the disc name, table of contents, copyright, and release information. The meta data related to the disc format includes an aspect ratio, subtitles, running time, and audio information. The meta data about materials related to the disc includes thumbnails and related URLs.

Like the disc information 120, the title information 130 also includes meta data related to content creation, content format, materials related to the content, and other information defined by the author of the content. The meta data related to content creation includes a title name, a title type, and names of organizations involved in the title production (filming) and release. The meta data related to the content format includes credits, promotional information, the content type, and reviews. The credits list the cast, crew and other parties involved with the production. The promotional information includes the genre, the language, and a parental guide (e.g. suitability for people under 18 years old). The meta data about materials related to the content includes, but is not limited to, a synopsis, an award list, and related URLs.

Figure 2:
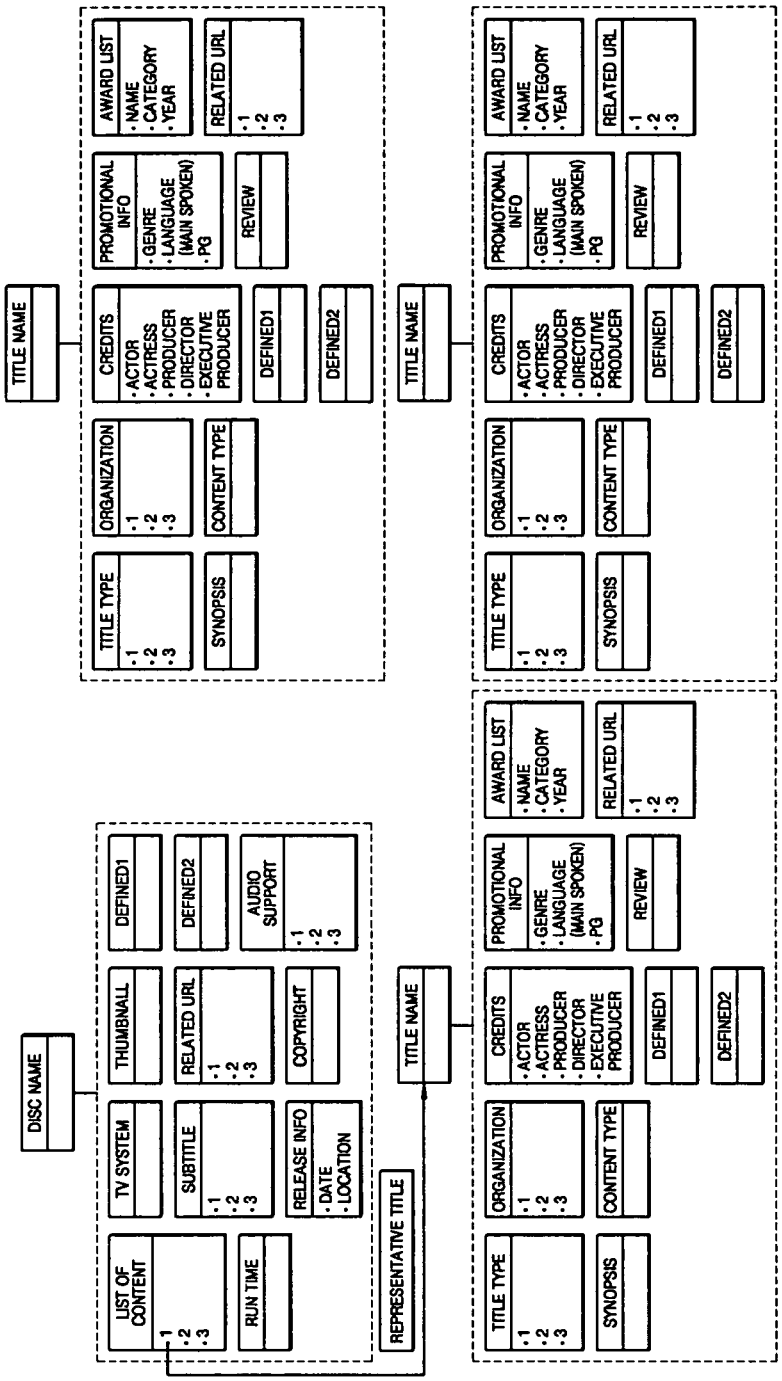
FIG. 2 illustrates an example of meta data recorded on a disc.

FIG. 2 illustrates an example of meta data recorded on a disc. It can be seen from FIG. 2 that at least one item related to disc related meta data is recorded on a disc, but the disc may also include a plurality of items related to titles and thus the disc includes a plurality of items of title related meta data.

Various items of meta data are recorded on one disc, and a user can easily find a disc on which desired AV content is recorded, or a title or disc in which a desired actor or actress appears, by searching the meta data.

During a search, in an embodiment of the present invention, since there is a high possibility that the user's interest AV content is included in a representative title of a disc, meta data of the representative title of the disc is preferentially searched without searching for meta data of all titles. Also, when a plurality of discs are loaded, meta data of a representative title of each of the discs is searched preferentially, over other meta data recorded on the plurality of discs, thereby speeding up the search when compared to a search for meta data of all titles.

Figure 3:
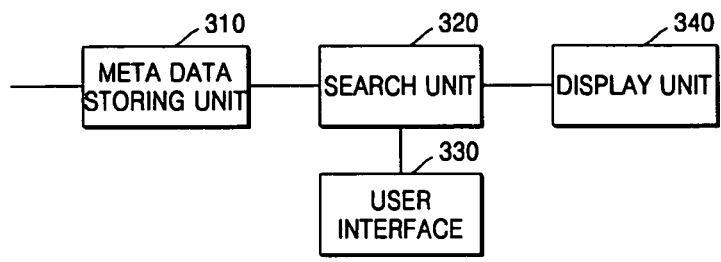
FIG. 3 is a block diagram of a multimedia data reproduction apparatus according to an embodiment of the present invention.

FIG. 3 is a block diagram of a multimedia data reproduction apparatus according to an embodiment of the present invention.

Referring to FIG. 3, the multimedia data reproduction apparatus searches for meta data included in a meta data storing unit 310 according to a search condition input through a user interface unit 330, and outputs the result of the search through a display unit 340. To this end, the multimedia reproduction apparatus includes the meta data storing unit 310, a search unit 320, the user interface unit 330, and the display unit 340.

The meta data storing unit 310 receives and stores meta data from an information storage medium such as a disc. Once an information storage medium such as a disc is loaded into the multimedia data reproduction apparatus, meta data related to the information storage medium remains in the meta data storing unit 310 even after the information storage medium is ejected. The search condition for the meta data stored in the meta data storing unit 310 is input to the user interface unit 330 from the user. In other words, a search word for a disc name, an actor or actress, or a director is input to the user interface unit 330 through various devices such as a remote controller. The search unit 320 searches for meta data and outputs meta data that matches the search condition to the display unit 340. The method used by the search unit 320 will be described later.

Figure 4:
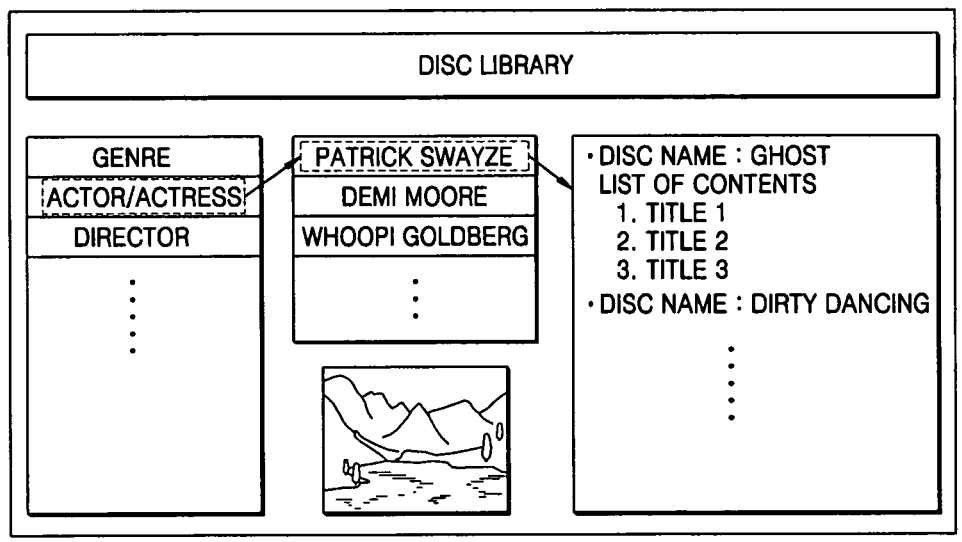
FIG. 4 illustrates an example of a search result screen output by a display unit.

FIG. 4 illustrates an example of a search result screen output by the display unit 340.

Referring to FIG. 4, to aid the user's search, fields of the meta data stored in the meta data storing unit 310 are shown (genre, actor/actress, or director). Once the user selects one of the fields, sub meta data related to the selected field is shown in detail for the user's further selection. For example, if the user selects an "actor/actress" field, all the actor/actress information stored in the data storing unit 310 is shown. Thus, the display unit 340 outputs a search result screen as shown in FIG. 4.

Figure 5:
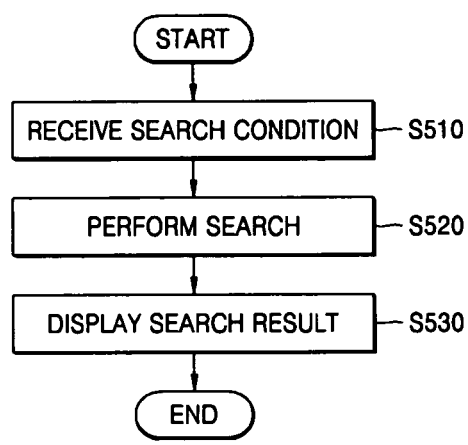
FIG. 5 is a flowchart illustrating a multimedia data reproduction method according to an embodiment of the present invention.

FIG. 5 is a flowchart illustrating a multimedia data reproduction method according to an embodiment of the present invention.

A search condition is received from a user in operation S510. A search for meta data is performed according to the search condition in operation S520. At this time, meta data of a representative title is preferentially searched. The method of searching for meta data can be, for example, a preferential search method for specific meta data. In other words, meta data to be preferentially searched can be selected from among a plurality of items of meta data using a preferential search method.

For example, in the case of "actor/actress", meta data to be preferentially searched can be selected from among various attributes of the actor or actress, such as gender, preferred genres, film appearances, or age. An exclusive search involves searching for meta data that exactly matches the user's search condition, and an inclusive search involves searching for meta data that partially matches user's search condition.

Next, the result of the search is displayed in operation S530. Also, multimedia data corresponding to the best matched meta data may be preferentially displayed or be arranged sequentially in order of best matching.

Figure 6:
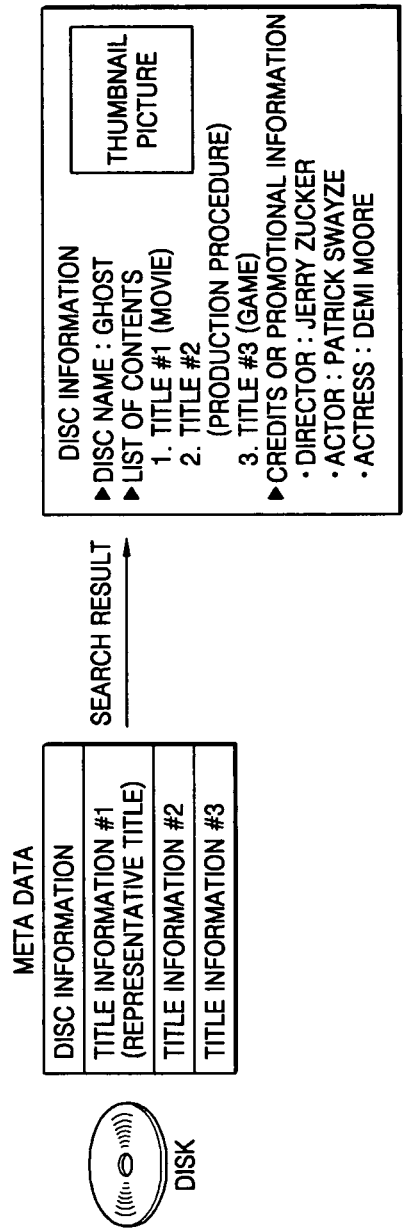
FIG. 6 illustrates an example of the result of a search using a representative title.

FIG. 6 illustrates an example of the result of a search using a representative title.

Meta data recorded on a disc includes a single item of disc information and a plurality of items of title information. In FIG. 6, title information #1 is a representative title, and disc information according to a search result is displayed along with representative title information. A title #1 is a main title of a movie. And, credits or promotional information are displayed as title information related to the representative title, along with disc information.

Figure 7:
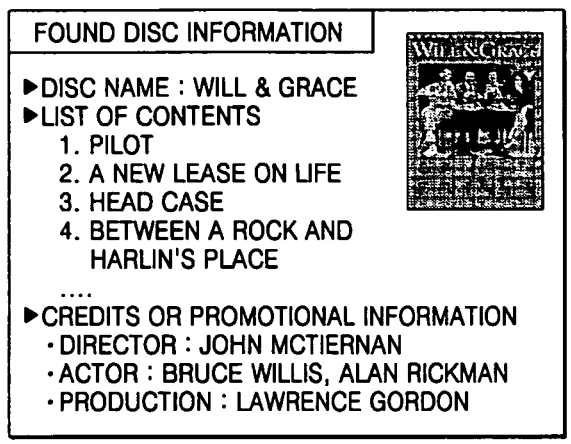
FIG. 7 illustrates another example of the result of a search using a representative title.

FIG. 7 illustrates another example of the result of a search using a representative title.

In FIG. 7, a TV series is used as an example, and every episode is designated as a representative title. Also, in the case of a music disc, a main music file and a karaoke file, an accompaniment file, and a music video related to the main music file can be included, and the main music file or the music video can be designated as a representative title.

As such, a representative title may be any title having material used to represent content, and a general title may be one that partially overlaps with the contents of a representative title, one in a different format from the representative title, or one including content of another format that is different from that a disc desires to contain. For example, in a disc containing a movie, a general title may be a game title related to the movie, or music title from the soundtrack of the movie.

Figure 8:
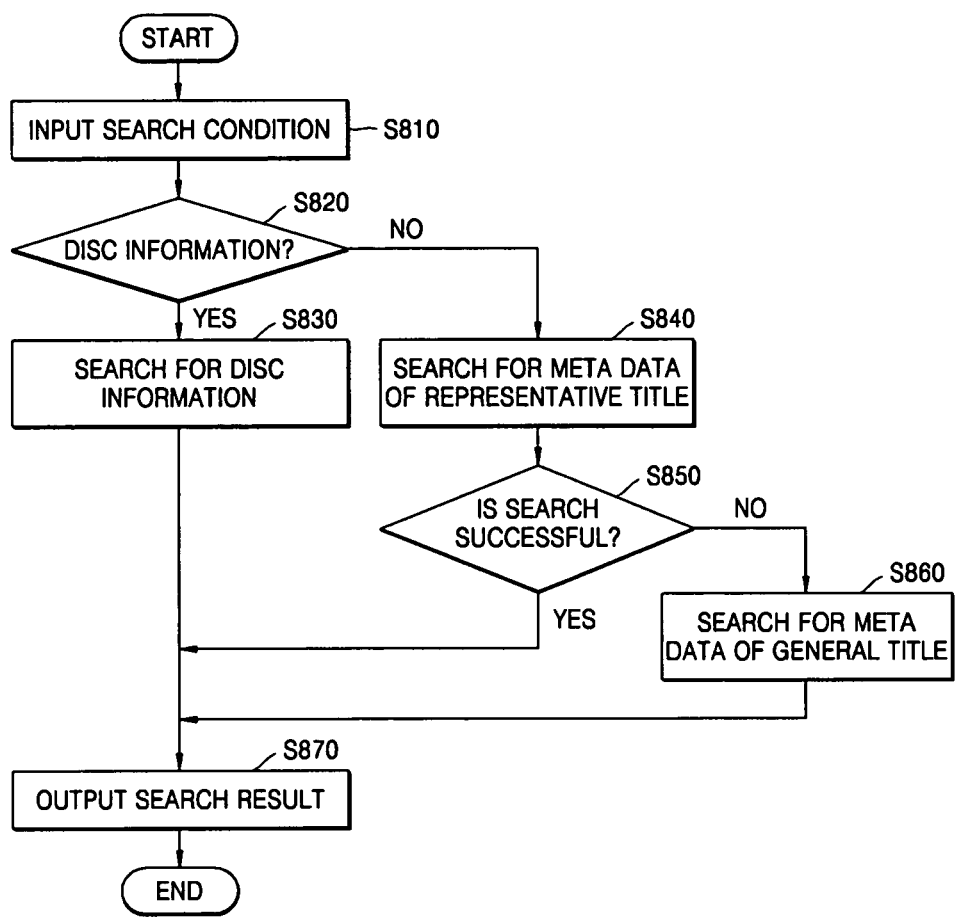
FIG. 8 is a detailed flowchart illustrating a method of searching for meta data according to the present invention.

FIG. 8 is a detailed flowchart illustrating a method of searching for meta data according to an embodiment of the present invention.

A search condition for the user's search is input in operation S810. It is determined whether the input search condition is related to searching for disc related meta data in operation S820. If the input search condition is related to a disc related meta data, a plurality of items of disc related meta data identified as disc_id are searched in operation S830 and a corresponding search result is output in operation S870. If there is no disc related meta data that matches the input search condition, a message is output indicating that no match could be found. If the input search condition is not related to searching for disc related meta data, meta data of a title designated as a representative title is searched in operation S840. A plurality of pieces of title related meta data are identified as title_id, and a representative title among the title related meta data is identified as rtitle_id. At operation 850, it is determined whether any meta data matches the input search condition. If a desired search result is obtained, the search result is displayed in operation S870. Otherwise, meta data is not found in a representative title. Thus, meta data of a general title is further searched in operation S860, and a corresponding search result is output in operation S870.

Figure 9A:
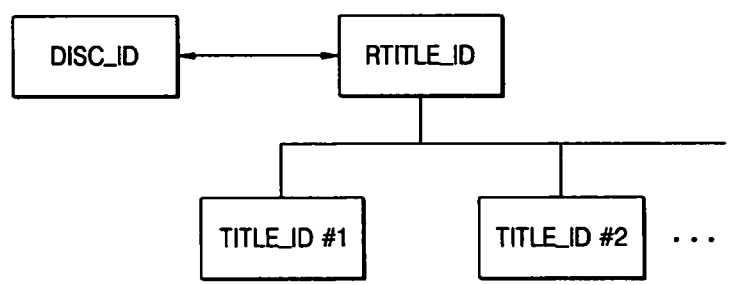
FIGS. 9A and 9B illustrate the relationship between disc meta data and title meta data.
Figure 9B:
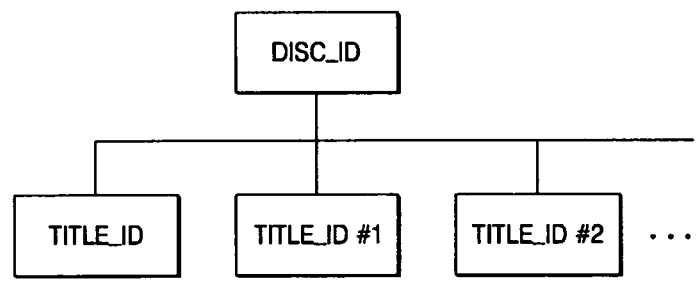

FIGS. 9A and 9B illustrate the relationship between disc meta data and title meta data.

Referring to FIG. 9A, a representative title is structurally placed higher than a general title, and a general title is present in a sub structure of a representative title. In this case, disc information a user desires to find using meta data can be found by searching for disc meta data indicated by disc_id, and title information a user desires to find using meta data can be found by preferentially searching for meta data indicated by a representative title rtitle_id. If a user desires to find disc information, disc information obtained according to a search result is displayed along with summary information about a designated representative title in a disc, thereby providing the user with abundant information.

In this case, since a representative title is structurally placed higher than a general title, a representative title is not separately identified as rtitle_id but can be identified as title_id that has the same form as a general title. In other words, for example, a representative title may be identified as "10000000", and a general title may be identified as "10000001" or "10000010".

Referring to FIG. 9B, a representative title is placed at the same level as a general title. In this case, an additional mark has to be given to title_id to indicate that rtitle_id denotes the representative title. In other words, if "00000001" and "00000010" are used as an ID of the general title, "10000001" should be used as an ID of the representative title. Also, in this case, if a user desires to find meta data corresponding to title information, meta data of the representative title identified as rtitle_id is searched first, and meta data of the general title identified as title_id is searched next. If information desired by the user is disc information, meta data indicated by disc_id is searched. In FIGS. 9A and 9B, there may be a plurality of representative titles in a disc.

As described above, meta data stored in a disc includes disc related meta data and title related meta data, which can refer to each other's contents and may be linked with each other. For example, when disc related meta data is displayed, title information included in the disc may be required, or when title related meta data is displayed, it may be necessary to indicate the disc in which a title is included. In this case, the meta data related to the disc and the meta data related to the title refer to each other's contents or are linked together. For reference or linkage, disc_id and title_id are used. To refer to or link with a representative title among a plurality of titles, a title identified as rtitle_id is searched for.

As described above, according to an embodiment of the present invention, meta data of a representative title is preferentially searched, thereby speeding up a search for desired meta data. In other words, when a specific disc, title, or scene is searched for using meta data, to provide the result to a user, meta data of a representative title is preferentially searched, thereby reducing the time required for a search when compared to a search for all meta data.

Also, when meta data of a disc or title is displayed to a user, information corresponding to a representative title is also displayed. Thus, the user can be provided with more detailed information.

The method of searching for meta data and the multimedia data reproduction method using the method can also be embodied as a computer program. Code and code segments forming the computer program can be easily construed by computer programmers skilled in the art. Also, the computer program can be stored in a computer readable medium and read and executed by a computer, thereby implementing the method of searching for meta data and the method of reproducing multimedia data using the method. Examples of computer readable media include magnetic tapes, optical data storage devices, and carrier waves.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for reproducing audio/video (AV) data, the apparatus comprising:
a metadata storing unit comprising a memory, the metadata storing unit being configured to store metadata of at least one disc, each disc comprising more than one title audio/video stream, the metadata of a disc comprising disc information and more than one title information respectively corresponding to the more than one title audio/ video stream, the disc information being metadata about the disc itself, each title information being metadata about a respective title audio/video stream included in the disc, a metadata file of a disc being copied into the metadata storing unit when the disc is inserted into the reproducing apparatus, the metadata being formed when the metadata files of the inserted discs are accumulated; and a search unit configured to present metadata from a representative title information with the disc information to help a user to identify the disc and a feature of the disc when showing the disc information of a result which is selected by the user;

wherein the representative title information comprises attribute information configured to be used to indicate a representative title audio/video stream among the more than one title audio/video stream;

the disc information comprises format information about the more than one title audio/video stream;

the more than one title information comprises the representative title information and a general title information;

the representative title information is placed at a higher data structural level than the general title information and includes the general title information connected using a sub link; and the search unit is further configured to:
preferentially search for the representative title information; and
further search for the general title information if the search unit cannot find the metadata that matches the search condition.

2. An apparatus for reproducing audio/video (AV) data, the apparatus comprising:

a metadata storing unit comprising a memory, the metadata storing unit being configured to store metadata of at least one disc, each disc comprising more than one title audio/video stream, the metadata of a disc comprising disc information and more than one title information respectively corresponding to the more than one title audio/video stream, the disc information being metadata about the disc itself, each title information being metadata about a respective title audio/video stream included in the disc, a metadata file of a disc being copied into the metadata storing unit when the disc is inserted into the reproducing apparatus, the metadata being formed when the metadata files of the inserted discs are accumulated; and a search unit configured to present metadata from a representative title information with the disc information to help a user to identify the disc and a feature of the disc when showing the disc information of a result which is selected by the user;

wherein the representative title information comprises attribute information configured to be used to indicate a representative title audio/video stream among the more than one title audio/video stream;

the disc information comprises format information about the more than one title audio/video stream;

the more than one title information comprises the representative title information and a general title information; and the representative title information is placed at a same data structural level as the general title information and has an ID that is different from an ID of the general title information.

3. The apparatus of claim 2, wherein the search unit is further configured to:
preferentially search for the representative title information; and
further search for the general title information if the search unit cannot find the metadata that matches the search condition.

4. A computer-implemented method of searching for metadata, the method comprising:

storing the metadata of at least one disc, each disc comprising more than one title audio/video stream, the metadata of a disc comprising disc information and more than one title information respectively corresponding to the more than one title audio/video stream, the disc information being metadata about the disc itself, each title information being metadata about a respective title audio/video stream included in the disc, a metadata file of a disc being copied into the metadata storing unit when the disc is inserted into the reproducing apparatus, the metadata being formed when the metadata files of the inserted discs are accumulated, and presenting metadata from a representative title information with the disc information to help a user to identify the disc and a feature of the disc, when showing the disc information of a result which is selected by the user;

wherein the representative title information comprises attribute information which is used to indicate a representative title audio/video stream among the more than one title audio/video stream;

the more than one title information comprises the representative title information and a general title information;

the representative title information is placed at a higher data structural level than the general title information and includes the general title information connected using a sub link; and the receiving of the search condition further comprises:
preferentially searching for the representative title information; and
further searching for the general title information if the metadata that matches the search condition cannot be found.

5. A computer-implemented method of searching for metadata, the method comprising:

storing the metadata of at least one disc, each disc comprising more than one title audio/video stream, the metadata of a disc comprising disc information and more than one title information respectively corresponding to the more than one title audio/video stream, the disc information being metadata about the disc itself, each title information being metadata about a respective title audio/video stream included in the disc, a metadata file of a disc being copied into the metadata storing unit when the disc is inserted into the reproducing apparatus, the metadata being formed when the metadata files of the inserted discs are accumulated, and presenting metadata from a representative title information with the disc information to help a user to identify the disc and a feature of the disc, when showing the disc information of a result which is selected by the user;

wherein the representative title information comprises attribute information which is used to indicate a representative title audio/video stream among the more than one title audio/video stream;

the more than one title information comprises the representative title information and a general title information; and the representative title information is placed at a same data structural level as the general title information and has an ID that is different from an ID of the general title information.

6. The method of claim 5, wherein the receiving of the search condition further comprises:
preferentially searching for the representative title information; and
further searching for the general title information if the metadata that matches the search condition cannot be found.

* * * * *